United States Patent [19]

Hutter, III

[11] Patent Number: 5,603,472
[45] Date of Patent: Feb. 18, 1997

[54] FLUSH MOUNTED PANEL FASTENER

[75] Inventor: Charles G. Hutter, III, Carson City, Nev.

[73] Assignee: Physical Systems, Inc., Carson City, Nev.

[21] Appl. No.: 475,179

[22] Filed: Jun. 7, 1995

[51] Int. Cl.$^6$ .............. B64C 1/12; F16B 19/02; F16B 41/00
[52] U.S. Cl. .............. 244/132; 244/133; 411/373; 411/910
[58] Field of Search .............. 244/132, 121, 244/133; 411/372, 373, 377, 910

[56] References Cited

U.S. PATENT DOCUMENTS

| | | | |
|---|---|---|---|
| 4,309,123 | 1/1982 | Moore | 403/408 |
| 4,822,227 | 4/1989 | Duran | 411/373 |
| 5,013,391 | 5/1991 | Hutter, III et al. | 156/578 |
| 5,391,028 | 2/1995 | Charles | 244/132 |

Primary Examiner—Andres Kashnikow
Assistant Examiner—Virna Lissi Mojica
Attorney, Agent, or Firm—Kelly, Bauersfeld & Lowry

[57] ABSTRACT

A flush mounted panel fastener is provided for use in aircraft or the like of the so-called stealth type designed to avoid detection by radar. The panel fastener comprises a fastener element such as a threaded bolt having a head and shank for fastening a panel onto a substrate or frame. The head is sized for recessed seating within a counterbore formed in the panel, and a fastener cap is mounted and magnetically retained on the head of the fastener element. The fastener cap has a surface coating or finish thereon disposed substantially coplanar with an outer surface of the panel, wherein the surface coating is formed from a suitable nonreflective radar material and cooperates with the panel to present a substantially uninterrupted surface of low radar signature.

15 Claims, 2 Drawing Sheets

FLUSH MOUNTED PANEL FASTENER

BACKGROUND OF THE INVENTION

This invention relates generally to improvements in panel fasteners of the type used in aircraft and the like. More specifically, this invention relates to an improved panel fastener particularly for use in aircraft and the like of the so-called stealth type designed to avoid detection by radar.

Panel fasteners are used in large numbers on modern aircraft for removably mounting various panels such as access doors and engine bay covers and the like. Such panel fasteners typically comprise a fastener element such as a bolt having a threaded shank and a head formed to include an appropriate driving slot or recess. A mating driving tool is used for fastener installation to secure the panel prior to normal flight operations, and subsequently as needed for fastener removal to permit appropriate service and/or maintenance functions.

In recent years, substantial research and development efforts have focused upon designing military aircraft capable of avoiding detection by radar. Toward this end, military aircraft have been designed wherein external aircraft surfaces are formed with a geometry and from a material to be substantially nonreflective with respect to standard radar signals. Specifically, such aircraft are constructed to include broad and substantially planar uninterrupted surfaces defined by dielectric material such as composite carbon fiber structures. However, such aircraft necessarily include a number of removable panels such as access doors and engine bay covers to accommodate requisite access to internal mechanisms and electronic equipment, etc. Conventional panel fasteners include fastener heads with recessed driving slots formed therein as previously described, wherein such driving slots present surface interruptions or step discontinuities which can undesirably reflect radar signals and thus permit radar detection of the aircraft.

In the past, panel fasteners for radar avoidance aircraft have required additional structures and/or special treatment steps to avoid undesirable surface discontinuities. In one concept, an auxiliary cap having a dielectric surface coating has been proposed for thread-on attachment to an installed panel fastener. However, the auxiliary cap necessarily requires its own driving slot or recess which still presents a surface discontinuity that can reflect radar signals. In another concept, the head of the panel fastener is covered and filled with a brush-on and curable dielectric material to eliminate surface discontinuities, but such materials must be removed to reveal the fastener driving slot before the fastener can be removed when it is desired to open an access panel.

The present invention overcomes the problems and disadvantages encountered in the prior art by providing an improved panel fastener for use in radar avoidance aircraft and the like, wherein the installed panel fastener substantially eliminates undesired surface discontinuities.

SUMMARY OF THE INVENTION

In accordance with the invention, an improved panel fastener is provided for use in a radar avoidance aircraft or the like, for removable mounting of an access door or panel. The improved panel fastener is designed for flush-mount installation through the associated panel while presenting a substantially uninterrupted flush-mount geometry to avoid significant reflection of radar signals.

The flush mounted panel fastener of the present invention comprises a fastener element such as a bolt having a threaded shank and an enlarged head with a driving recess or slot formed therein. The fastener is adapted for shank passage through a bolt opening formed in the associated aircraft panel, for shank engagement with a nut or the like mounted on an appropriate substrate or frame. When installed, the fastener head is seated within a counterbore formed in the panel, in a position recessed relative to an external surface plane of the panel. In this regard, the external panel surface is defined by a material such as a composite dielectric material for minimal reflection of radar signals.

The fastener head includes a first magnetic element mounted therein, preferably at the base of the driving slot. In one preferred form, the magnetic element comprises a high strength rare earth magnet which is mounted within the driving slot by means of a suitable potting compound. A removable fastener cap includes a counterpart second magnetic element for slide-fit reception into the driving slot, in magnetically coupled relation with the first magnetic element mounted in the fastener head. The cap additionally includes a cover plate having a size and shape for seated reception into the panel counterbore, with a surface coating designed for minimal reflection of radar signals and disposed substantially flush or coplanar with the associated panel. Accordingly, when installed, the fastener cap cooperates with the panel to define a substantially uninterrupted surface of appropriate material for substantial nonreflection of radar signals.

When access to the panel fastener is desired for appropriate removal of the associated panel, the fastener cap may be removed quickly and easily. In one preferred form, a removal tool is provided with a pick-off magnet which, when placed in close proximity to the fastener cap, is magnetically coupled to the fastener cap by a force greater than the coupling force between the first and second magnetic elements. Accordingly, the fastener cap can be separated quickly and easily from the fastener to expose the fastener and its driving slot for facilitated fastener removal.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
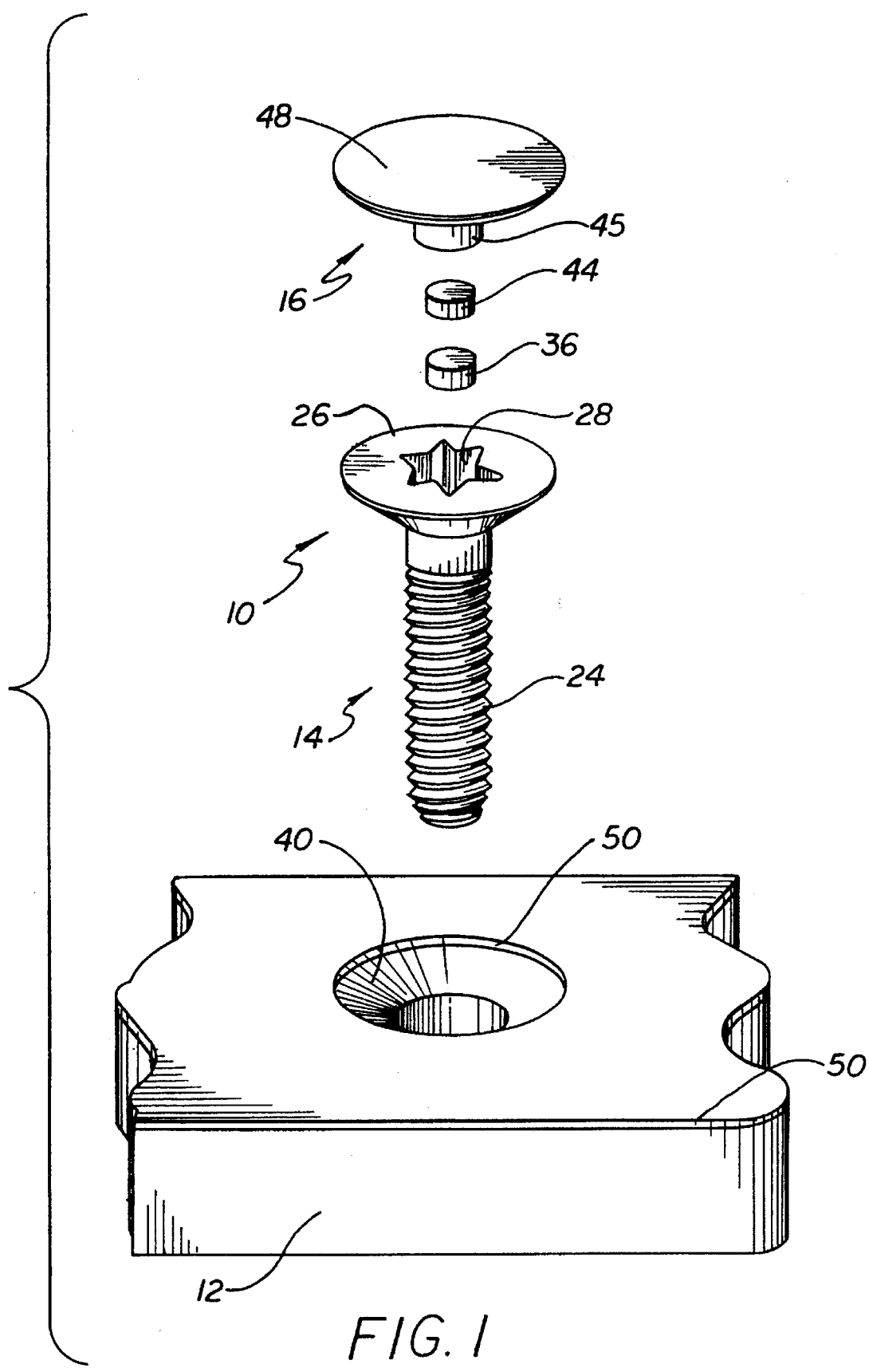
FIG. 1 is an exploded perspective view illustrating an improved panel fastener constructed in accordance with the present invention, in association with an aircraft panel or access door.
Figure 2:
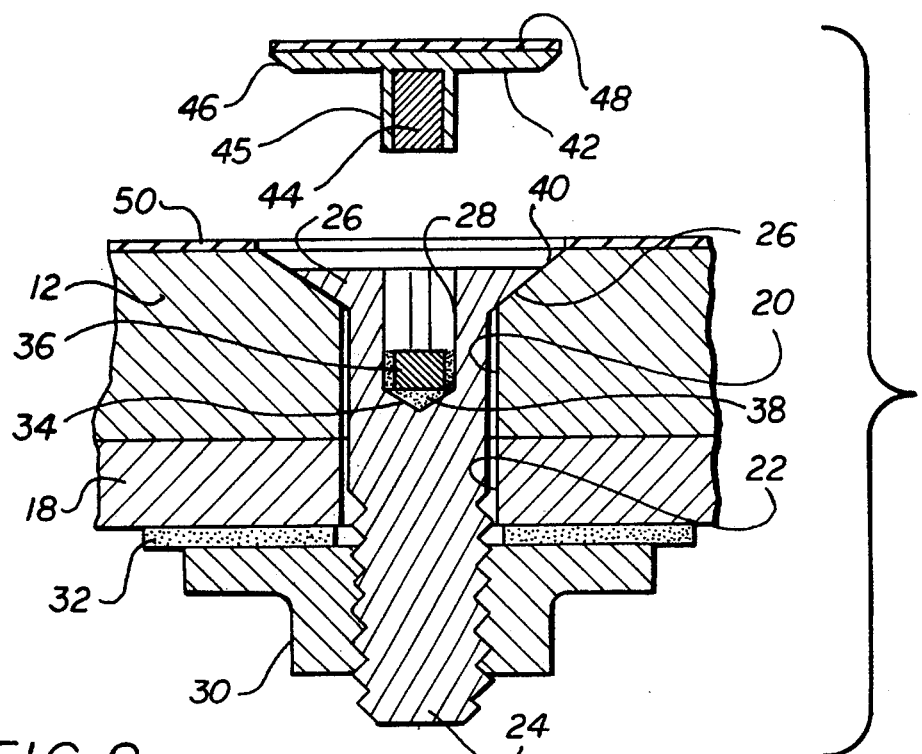
FIG. 2 is an enlarged vertical sectional view illustrating an installed fastener element in exploded relation with a fastener cap.
Figure 3:
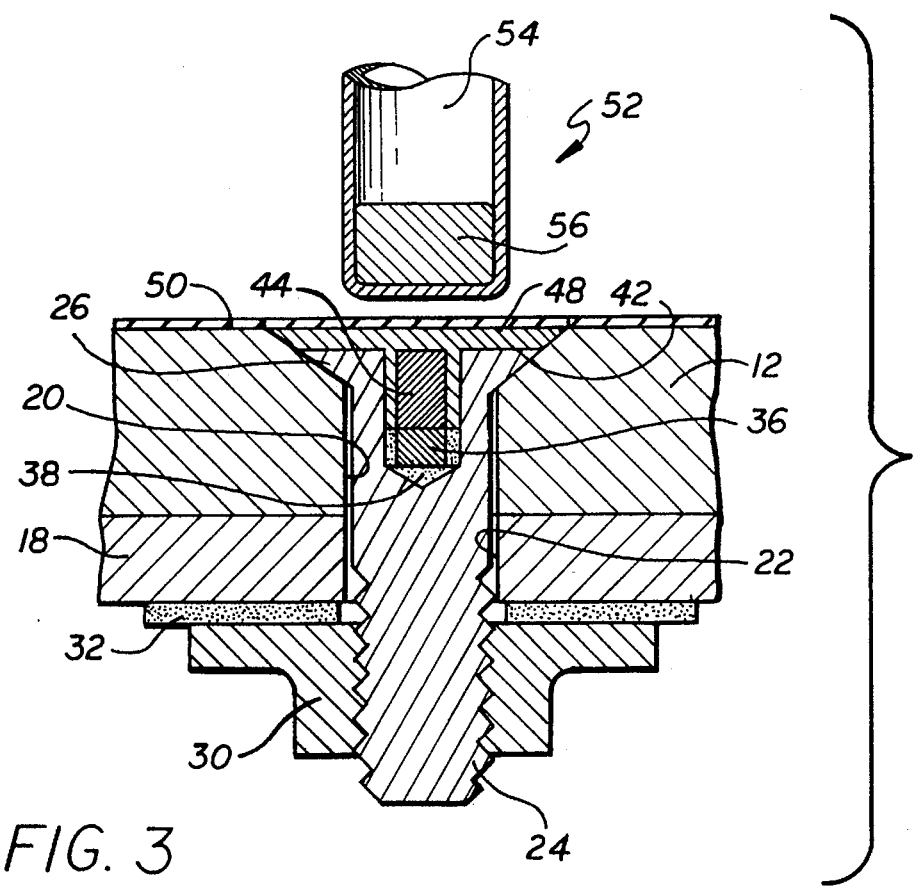
FIG. 3 is an enlarged sectional view similar to FIG. 2, and illustrating the installed fastener element and cap in exploded relation with a cap removal tool.

As shown in the exemplary drawings, an improved panel fastener referred to generally by the reference numeral 10 in FIGS. 1–3 is provided for flush-mount installation with respect to a panel 12 or other substrate structure in a radar avoidance aircraft or the like. The panel fastener 10 comprises a fastener element 14 such as a threaded bolt, in combination with a removable cap 16 adapted for mounting onto and magnetic retention upon the fastener element. When the fastener element 14 is fully installed, in association with the cap 16 (as viewed in FIG. 3), the fastener 10 cooperates with the panel 12 to define a substantially continuous or noninterrupted surface area defined by materials which are substantially nonreflective of radar signals.

Radar avoidance aircraft and the like are generally known to include external exposed surfaces of preferably planar geometry and formed from specialized materials such as carbon fiber composites and/or related dielectric surface coatings which are substantially nonreflective of radar signals. As a result, military aircraft and other military vehicles have been constructed and demonstrated to have a sufficiently low radar signature to substantially avoid radar detection.

The illustrative panel 12 is typical of various access doors and covers used on aircraft and the like to permit service and/or maintenance access to components and systems of the aircraft. FIGS. 2 and 3 show the panel 12 mounted by means of the fastener 10 onto an appropriate substrate or frame 18. As shown, the panel 12 and substrate 18 include aligned fastener ports 20 and 22 for receiving the fastener element 14 in the form of a bolt having a threaded shank 24 and an enlarged head 26 with a driving slot or recess 28 formed therein. A nut element 30 is shown mounted by a layer of adhesive 32 or the like on an inboard side of the substrate 18 for thread-in reception of the bolt shank 24, all in a general manner which is well-known to persons skilled in the art. The nut element 30 may be of a type adapted for mounting at a blind side of the substrate as generally shown and described in U.S. Pat. No. 5,013,391 which is incorporated by reference herein.

In accordance with a primary aspect of the present invention, the fastener element 14 is modified from a conventional geometry to include a longitudinally extended recess or pocket 34 located at the base of the driving slot 28. This central head pocket 34 has a size and shape to receive a first magnetic element 36 formed preferably from a high strength magnet material such as a rare earth magnet. The first magnetic element 36 is shown in FIGS. 2 and 3 to be installed within the head pocket 34 by means of a suitable epoxy potting compound 38 or the like. However, it will be understood by persons skilled in the art that the magnetic element 36 can be installed by alternative means. Importantly, the magnet element 36 is positioned to permit normal engagement between the fastener element and a driving tool (not shown) for normal drive-in mounting and drive-out removal.

The fastener element 14, as described above, is installed through the panel and substrate ports 20, 22 in a conventional manner for thread-in engagement with the nut element 30. When installed, as viewed in FIG. 2, the head 26 is seated within a shallow counterbore 40 formed in the external surface of the panel 12, with an outermost plane of the head 26 disposed in recessed relation to the outer surface plane of the panel 12.

The removable cap 16 comprises a generally circular plate or disk 42 for supporting a second magnetic element 44 at an inboard side thereof, as by mounting within a sleeve 45. The sleeve 45 and magnetic element 44 are sized for slide-fit reception into the driving slot 28 in magnetically coupled relation with the first magnetic element 36. Once again, a preferred material for the second magnetic element 44 comprises a high strength rare earth magnet, with appropriate pole orientation for strong magnetic coupling of the two elements 36, 44. Alternately, one of the magnetic elements 36, 44 may be constructed from a magnetically attracted material for strong force coupling with the other element in the form of a rare earth magnet or the like. The cap disk 42 is sized and shaped for close tolerance reception within the panel counterbore 40 with an outboard cap surface disposed substantially coplanar with the outer surface plane of the panel 12. In this regard, the peripheral edge 46 of the fastener cap 16 is desirably formed at a suitable angle to match the counterbore geometry, and to orient the cap 16 substantially flush or coplanar with the outer surface plane of the panel 12. Importantly, a surface coating 48 of appropriate dielectric and/or composite material is formed on the cap disk 42, wherein this surface coating 48 cooperates with a substantially nonreflective outer surface (shown as a surface coating 50) of the panel 12 to present a substantially continuous and uninterrupted planar structure which is highly nonreflective to an incident radar signal.

The cap 16 is designed for quick and easy removal when it is desired to remove the panel 12 from the aircraft for appropriate repair and/or maintenance procedures. In a preferred form of the invention, cap removal is achieved by means of a removal tool 52 (FIG. 3) in the form of a hand held probe 54 having a high strength magnet 56 carried at a tip end thereof. The probe magnet 56 is designed for high strength magnetic coupling with the cap magnetic element 44, with a coupling force exceeding the magnetic coupling force between the cap and fastener magnetic elements 36 and 44. Accordingly, the tool 52 can be used to quickly and easily pick-off the fastener cap 16 from the underlying fastener element 14, to correspondingly expose the driving slot 28 to permit removal of the fastener element from the panel 12. When a repair or maintenance procedure is completed, the fastener element 14 can be reinstalled quickly and easily, followed by reinstallation of the fastener cap 16. During subsequent flight operations, the magnetic coupling force between the fastener element 14 and the fastener cap 16 is sufficient to prevent inadvertent dislodging of the removable cap 16.

A variety of further modifications and improvements to the flush mounted panel fastener of the present invention will be apparent to those skilled in the art. Accordingly, no limitation on the invention is intended by way of the foregoing description and accompanying drawings, except as set forth in the appended claims.

What is claimed is:

1. A panel fastener, comprising:

a fastener element having a shank and an enlarged head at one end of said shank, said head having a driving recess formed therein;

a first magnetic element mounted within said driving recess; and a fastener cap including a plate having a size and shape to substantially overlie and cover said head, and a second magnetic element carried by said plate for slide-fit reception into said driving recess in magnetically coupled relation with said first magnetic element for magnetically retaining said fastener cap on said fastener element.

2. The panel fastener of claim 1 wherein said cap plate has an inboard surface with said second magnetic element mounted thereon, and an outboard surface defined by a material which is substantially nonreflective to a radar signal.

3. The panel fastener of claim 2 wherein said outboard surface is a surface coating on said plate.

4. The panel fastener of claim 1 wherein said cap plate has a peripheral edge formed on a taper to match the geometry of a counterbore formed in a panel through which the fastener element is to be installed.

5. The panel fastener of claim 1 further including means for fixing said first magnetic element within said driving recess.

6. The panel fastener of claim 5 wherein said fixing means comprises a potting compound.

7. The panel fastener of claim 1 wherein at least one of said first and second magnetic elements comprises a rare earth magnet.

8. The panel fastener of claim 1 further including a removal tool having a relatively high strength magnet mounted on a probe for magnetically separating said fastener cap from said fastener element.

9. The panel fastener of claim 1 wherein said shank is threaded.

10. A panel fastener for use with a panel having an outer surface defined by a material substantially nonreflective to radar signals and having a fastener port therein with a counterbore at an outboard end of the fastener port, said panel fastener comprising:

a fastener element having a shank and an enlarged head at one end of said shank, said head having a driving recess formed therein;

said fastener element being receivable within the panel fastener port with said head disposed in said counterbore in a position recessed relative to an outer plane of the panel;

a first magnetic element mounted within said driving recess in a position to permit normal driving engagement of said fastener element with a driving tool; and a fastener cap including a plate having a size and shape to substantially overlie and cover said head and to substantially occupy and close said counterbore, said fastener cap having a second magnetic element mounted at an inboard side thereof for slide-fit reception into said driving recess in magnetically coupled relation with said first magnetic element to retain said fastener cap on said fastener element, said plate further having an outboard surface defined by a material substantially nonreflective to radar signals and disposed substantially coplanar with said outer plane of said panel when said fastener cap is mounted on said fastener.

11. The panel fastener of claim 10 wherein said cap plate has a peripheral edge formed on a taper to substantially match said counterbore.

12. The panel fastener of claim 10 wherein wherein said outboard surface is a surface coating on said plate.

13. The panel fastener of claim 10 wherein further including means for fixing said first magnetic element within said driving recess.

14. The panel fastener of claim 10 wherein at least one of said first and second magnetic elements comprises a rare earth magnet.

15. The panel fastener of claim 10 further including a removal tool having a relatively high strength magnet mounted on a probe for magnetically separating said fastener cap from said fastener element.

* * * * *